United States Patent [19]

Dunne

[11] Patent Number: 5,667,560
[45] Date of Patent: Sep. 16, 1997

[54] PROCESS AND APPARATUS FOR DEHUMIDIFICATION AND VOC ODOR REMEDIATION

[75] Inventor: Stephen R. Dunne, Algonquin, Ill.

[73] Assignee: UOP, Des Plaines, Ill.

[21] Appl. No.: 633,260

[22] Filed: Apr. 18, 1996

Related U.S. Application Data

[63] Continuation-in-part of Ser. No. 373,840, Jan. 17, 1995, Pat. No. 5,512,083, which is a continuation-in-part of Ser. No. 140,920, Oct. 25, 1993, abandoned.

[51] Int. Cl.$^6$ ................................................. B01D 53/06
[52] U.S. Cl. ........................... 95/113; 95/115; 95/125; 95/143; 95/144; 96/125; 96/130; 96/144; 96/154
[58] Field of Search ....................... 95/107, 108, 115, 95/117–119, 121–123, 125, 126, 141, 143, 144, 113; 96/125, 130, 146, 150, 144

[56] References Cited

U.S. PATENT DOCUMENTS

| | | | |
|---|---|---|---|
| 2,993,563 | 7/1961 | Munters et al. | 95/113 X |
| 3,446,031 | 5/1969 | Chi et al. | 62/271 |
| 3,844,737 | 10/1974 | Macriss et al. | 95/113 X |
| 4,012,206 | 3/1977 | Macriss et al. | 95/113 |
| 4,134,743 | 1/1979 | Macriss et al. | 55/34 |
| 4,402,717 | 9/1983 | Izumo et al. | 55/388 |
| 4,409,006 | 10/1983 | Mattia | 95/113 |
| 4,421,532 | 12/1983 | Sacchetti et al. | 55/28 |
| 4,503,023 | 3/1985 | Breck et al. | 423/328 |
| 4,737,164 | 4/1988 | Sarkkinen | 95/141 X |
| 4,769,053 | 9/1988 | Fischer, Jr. | 55/389 |
| 4,775,484 | 10/1988 | Schmidt et al. | 95/113 X |
| 4,795,482 | 1/1989 | Gioffre et al. | 95/141 |
| 4,846,855 | 7/1989 | Tsujimoto | 95/141 X |
| 4,887,438 | 12/1989 | Meckler | 62/271 |
| 5,158,582 | 10/1992 | Onitsaka et al. | 95/113 X |
| 5,167,679 | 12/1992 | Maekawa et al. | 96/125 |
| 5,170,633 | 12/1992 | Kaplan | 95/123 X |
| 5,181,942 | 1/1993 | Jain | 55/31 |
| 5,208,197 | 5/1993 | Vassilakis et al. | 502/67 |
| 5,242,473 | 9/1993 | Ogasahara | 96/125 |
| 5,300,138 | 4/1994 | Fischer et al. | 96/125 |
| 5,401,706 | 3/1995 | Fischer | 95/117 X |
| 5,425,242 | 6/1995 | Dunne et al. | 95/119 X |
| 5,512,083 | 4/1996 | Dunne | 95/113 |

FOREIGN PATENT DOCUMENTS

| | | | |
|---|---|---|---|
| 2112661 | 7/1983 | United Kingdom | 95/113 |

OTHER PUBLICATIONS

Collier, Jr., R. K. "Advanced Desiccant Materials Assessment, Phase II, Final Report" (GRI–88/0125), Gas Research Institute, Chicago, IL, Jan. 1988, pp. 38–46.

Fischer, Jr., John C., "SEMCO's Advanced 1M Desiccant Cooling Technology" Advertizing Paper, Nov. 1993, 1800 East Point Drive, Columbia, MO 65201-3508.

*Primary Examiner*—Robert Spitzer
*Attorney, Agent, or Firm*—Thomas K. McBride; John G. Tolomei; Richard P. Silverman

[57] ABSTRACT

A process and apparatus for the dehumidification and VOC odor remediation of an air stream withdrawn from the passenger compartment of a transportation vehicle is disclosed which employs a continuously rotating wheel support and adsorbent selective for the adsorption of water and VOCs. The wheel is coated with a zeolite adsorbent selected from the low cerium rare earth exchanged zeolite Y-84, a rare earth exchanged zeolite LZ-210, a low cerium rare earth exchanged zeolite Y-64, and mixtures thereof. It was discovered that faujasites which have a zeolite structure including β-cages within which are located tri-valent cations exhibit a Type 1M adsorption isotherm for water which provides a good driving force for adsorption at low partial pressures and a heat of adsorption which is slightly greater than the heat of vaporization/condensation of water. A surprisingly significant increase in the thermal efficiency is possible as a result of the lower regeneration temperature of the adsorbent and the use of novel process steps.

23 Claims, 9 Drawing Sheets

PROCESS AND APPARATUS FOR DEHUMIDIFICATION AND VOC ODOR REMEDIATION

CROSS REFERENCE TO RELATED APPLICATIONS

This application is a continuation-in-part of U.S. patent application Ser. No. 08/373,840, filed Jan. 17, 1995, now U.S. Pat. No. 5,512,083, which is a continuation-in-part of U.S. patent application Ser. No. 08/140,920, filed Oct. 25, 1993, abandoned; the subject matter of which is hereby incorporated by reference.

FIELD OF THE INVENTION

This invention relates to a process and apparatus for the dehumidification and odor remediation of air over a solid adsorbent. More particularly this invention relates to an efficient process and apparatus for conditioning air to be used in an occupied space which is to be cooled, dehumidified and deodorized.

BACKGROUND OF THE INVENTION

Humidity and odor control is an important factor related to both human comfort and health. A relative humidity ranging from 20% to 80% is permissible for most activity; however, there is now a belief that a more optimum range of about 30% to about 60% is preferable to minimize and/or eliminate bacterial, viral and fungal growth. Maintaining this appropriate level of humidity as well as odor control in passenger compartments of transportation vehicles presents a particular problem. Existing dehumidifying devices either remove too much moisture from the air or do little to remediate odors.

Most odors in passenger compartments of transportation vehicles are the result of volatile organic compounds, VOCs, present in the circulating air. VOCs are formed in large quantities but at relatively low concentrations from engine exhaust, solvents, gas turbines, cogeneration plants, petrochemical plants, and in many industrial processes where waste gases contain such materials as vapors of various solvents, inks, paints, and so forth. VOCs contain not only hydrocarbons—saturated, unsaturated, and aromatic—but also contain oxygenated materials such as alcohols, esters, ethers, and acids, nitrogen containing compounds (principally amines), sulfur containing materials (mercaptans and thioethers) and halogen-containing materials, especially chlorine-substituted hydrocarbons but also organic fluorides and bromides. The presence of these VOCs in the gas stream can present a health risk or cause the gas stream to have an unpleasant odor.

Conventional adsorption systems for solvent recovery from humid air typically are operated until the solvent concentration in the outlet gas stream reaches a detectable preset breakthrough level whereupon the gas flow to the adsorber is stopped. The adsorbent bed then contains solvent, other condensable organic contaminants, and some amount of water which depends on the inlet relative humidity of the solvent laden gas stream. At this point, present-day techniques involve the introduction of a hot inert gas or steam, either saturated or superheated, which displaces the solvent from the adsorbent to produce a solvent/water mixture upon condensation. Typically two adsorber beds are used, where one is adsorbing while the other bed undergoes regeneration. More recent technology for regenerating and recovering solvent from adsorbent beds involves the use of inert gases (though for some solvents, air also can be used) and low temperature condensation of the solvent from the regenerating gas. Neither of these techniques is directly applicable for use in conditioning passenger compartments of transportation vehicles.

The removal of volatile organic compounds (VOC) from air by adsorption is most often accomplished by thermal swing adsorption (TSA). Air streams needing treatment can be found in most chemical and manufacturing plants, especially those using solvents. At concentration levels from 500 to 15,000 ppm, recovery of the VOC from steam used to thermally regenerate activated carbon adsorbent is economically justified. Concentrations above 15,000 ppm are typically in the explosive range and require the use of a hot inert gas rather than air for regeneration. Below about 500 ppm, recovery is not economically justifiable, but environmental concerns often dictate adsorptive recovery followed by destruction. In passenger cabins, the level of VOCs is relatively low, typically ranging from 0.01 to about 10 ppm. At this level, the VOCs can be safely returned to the environment. Activated carbon is the traditional adsorbent for these applications, which represents the second largest use for gas phase carbons. U.S. Pat. No. 4,421,532 discloses a process for the recovery of VOCs from industrial waste gases by thermal swing adsorption including the use of hot inert gases circulating in a closed cycle to desorb the VOCs.

One device employed for drying air in confined areas such as a home, a ship or a building down to 0.001 lbs water per pound of air is exemplified in U.S. Pat. No. 4,134,743 to Macriss et al. Macriss et al. disclose a process and apparatus wherein the adsorbent body is a wheel of thin sheets or layers of fibrous material containing about 10 to 90% by weight of a freely divided molecular sieve material. The apparatus includes a means for passing air to be processed in one direction through the wheel and a means for passing a regenerative air stream countercurrent to the air to be processed. In addition a cooling stream is provided in a direction cocurrent with the air stream.

U.S. Pat. No. 4,887,438 to Meckler discloses a desiccant assisted air conditioning system for delivering dehumidified refrigerated air to a conditioned space based on an adsorbent wheel. Meckler teaches the use of a desiccant wheel coated with silica gel, or a preferred hygroscopic salt, lithium chloride, to remove moisture from air. Meckler uses the waste heat from the refrigeration condenser to heat the reactivation air and employs a liquid refrigerant injection into the compressor to increase the pressure ratio in a positive displacement compressor to counter the problem of "thermal dumpback". Thermal dumpback is the associated heat conducted from the desiccant wheel to the treated air which occurs following the exposure of the wheel to heated regeneration air. This associated heat adds to the overall cooling load on the refrigeration system.

A U.S. Pat. No. 5,242,473 to Cgasahara discloses a gas dehumidifying apparatus which exhibits improved dehumidification efficiency to provide a treated gas with a high dryness level employing two dehumidifier rotors, wherein the second rotor uses a synthetic zeolite. Gas to be dehumidified is passed first to a silica gel coated rotor and then to the zeolite coated rotor. The rotors are regenerated by supplying a stream of heated gas through the second rotor and then the first rotor so that the adsorbent in the first rotor is regenerated at a lower temperature than the zeolite in the second rotor. A portion of the treated gas is used to countercurrently cool the rotors following regeneration.

Of those techniques for removing VOCs in low concentrations from a gas stream by adsorption, the most common method is exemplified in U.S. Pat. No. 4,402,717 to Izumo et al. In Izumo et al., an apparatus for removing moisture and odors from a gas stream comprises a cylindrical honeycomb structure made from corrugated paper, uniformly coated with an adsorbent and formed in the shape of a disk or wheel. The multiplicity of adsorbent-coated parallel flow passages formed by the corrugations in the paper serve as gas passage ways which are separated as a zone for the removal of water and odor causing components in the gas, and as a zone for the regeneration of the adsorbent. The zones for removal and regeneration are continuously shiftable as the wheel is rotated circumferentially about its centerline. Labyrinth seals separate the outer side of the rotary structure from the cylindrical wall of a sealed casing.

The coated wheel or rotor units of the prior art suffer a number of disadvantages. Generally, the wheels are quite large, with wheels typically ranging from 2 to 14 feet in diameter. One well-known problem is the hereinabove mentioned thermal dumpback problem. Some adsorbents require desorption to take place at temperatures which are significantly higher than adsorption temperatures. The greater the difference between the adsorption temperature and the desorption temperature, the greater the heat load on any air conditioning system resulting from the thermal dumpback, or sensible heat load placed on the adsorbent wheel. Configurations are sought to minimize this effect within the adsorption apparatus.

A second problem is related to the adsorbent employed. Hydrophilic adsorbents such as silica gel are typically chosen for dehumidification applications, but hydrophilic adsorbents are poor adsorbents for VOC removal. One such process combination is exemplified in U.S. Pat. No. 5,181, 942. On the other hand, hydrophobic adsorbents, such as high silica zeolites are typically recommended for VOC removal applications, yet are poor adsorbents for dehumidification application. Thus, applications for both dehumidification and VOC removal might typically require both types of adsorbents. Processes are sought wherein a single adsorbent can be employed for both operations. Furthermore, the adsorbent-coated paper and some adsorbent salts have a limited range of humidity and temperature within which they can maintain structural integrity. This failure also limits the regeneration medium to dry, moderate temperature gases and air. The contact between the adsorbent and the gas stream and hence the adsorbent capacity for the VOCs is limited to very thin layers of adsorbent on the surface of the fiber. This feature also limits the ultimate life of the adsorbent wheel, resulting in frequent wheel replacement.

In a report prepared for the Gas Research Institute by R. K. Collier, Jr., titled, "Advanced Desiccant Materials Assessment, Phase II" (GRI 88-0125), published January 1988, pages 38–46, Collier identified the critical parameters of desiccant cooling system as being dependent upon the physical and thermodynamic properties of the adsorbents employed in the desiccant cooling system. Collier characterized the most desirable desiccant or adsorbent as having a "Type 1M" adsorption isotherm. The Type 1M isotherm has a continuously negative curvature which provides a good driving force for adsorption at low partial pressures (relative humidity) and a heat of adsorption which is slightly greater than the heat of vaporization/condensation of water. Became these properties are generally not found together in the same adsorbent, and these properties are typically mutually exclusive in available commercial adsorbents, Collier theorized that, if such a material could be developed, its use would have an enormous impact on the performance of the resulting sorption cooling system.

An adsorber module is sought which does not have the adsorbent limitations of prior art adsorbent wheels, has an increased adsorbent capacity for the removal of VOCs and water, and has a lower sensitivity to the effects of sensible heat buildup or thermal dumping for use in dehumidifying and removing VOCs from passenger compartments of transportation vehicles.

SUMMARY OF THE INVENTION

The present invention relates to the surprising discovery of a class of solid adsorbents which may be used to both dehumidify and remove VOC odors from air. Even more surprising was the discovery that this class of adsorbents provided a combination of physical and thermodynamic properties which had only been theorized in the past. It was further discovered that this class of adsorbents, although known to be hydrophobic, could be employed as desiccants for adsorbing water at low relative humidity with the additional benefit of having a low desorption temperature which preferably ranges from about 65° C. to about 80° C. With a lower desorption temperature these adsorbents can provide significant advantages to adsorbent wheel systems by significantly reducing the thermal dumping problem.

The present invention in one embodiment provides an improved process for the dehumidification and VOC odor remediation of a cabin air stream withdrawn from a passenger compartment of a transportation vehicle. The process comprises a series of sequential steps. The cabin air stream is continuously passed at an adsorption temperature to a first portion of an adsorbent wheel. The adsorbent wheel supports a solid adsorbent selective for the adsorption of water and VOCs and permits the passage of the cabin air stream therethrough to provide a conditioned air stream. At least a portion of the conditioned air stream is passed to a second portion of the adsorbent wheel in a direction countercurrent to the passing of the air stream to cool the second portion of the adsorbent wheel and provide an intermediate air stream. The intermediate air stream is heated to a regeneration temperature to provide a heated intermediate air stream. The heated intermediate air stream is passed in a direction cocurrent to the air stream to a third portion of the adsorbent wheel to desorb water and VOCs and form an exhaust stream. The exhaust stream is exhausted and at least a portion of the conditioned air stream is returned to the passenger compartment.

In another embodiment, the invention provides an improved apparatus for the dehumidification and VOC odor removal of an air stream. The improved apparatus comprises a substrate surface formed into a rotatable wheel having axially parallel apertures therethrough. The substrate surface is coated with a selective adsorbent for the adsorption of water and VOCs. The selective adsorbent comprises faujasites having a zeolite structure including β-cages with tri-valent cations located in the β-cages. Examples of such faujasites include: low cerium rare earth exchanged zeolite Y-84, rare earth exchanged zeolite LZ-210, low cerium rare earth exchanged zeolite Y-64, and mixtures thereof. The tri-valent cations include cations selected from the Group VIII of the Periodic Table of the Elements and the Lanthanide series.

In a further embodiment, the invention provides a process for the dehumidification and VOC odor remediation of a cabin air stream withdrawn from a passenger compartment of an automobile. The process comprises a series of sequential steps. The cabin air stream is passed through a first portion of a continuously rotating adsorbent wheel to provide a conditioned air stream. The adsorbent wheel supports a solid adsorbent selective for the adsorption of water and VOC molecules. The adsorbent is selected from the group consisting of faujasites having a zeolite structure including β-cages and hexagonal prism wherein the tri-valent cations are located within the β-cages and at least one hexagonal prism separates the tri-valent cation from the VOC molecule. A cooling air stream is passed through a second portion of the wheel to cool the second portion and to provide an intermediate air stream. The intermediate air stream is heated to provide a heated air stream. The heated air stream is passed to a third portion of the wheel to desorb the water and VOCs from the adsorbent and to provide an exhaust stream. The conditioned air stream is cooled to provide a cooled air stream and at least a portion of cooled air stream is returned to the passenger compartment.

DETAILED DESCRIPTION OF THE INVENTION

Figure 1:
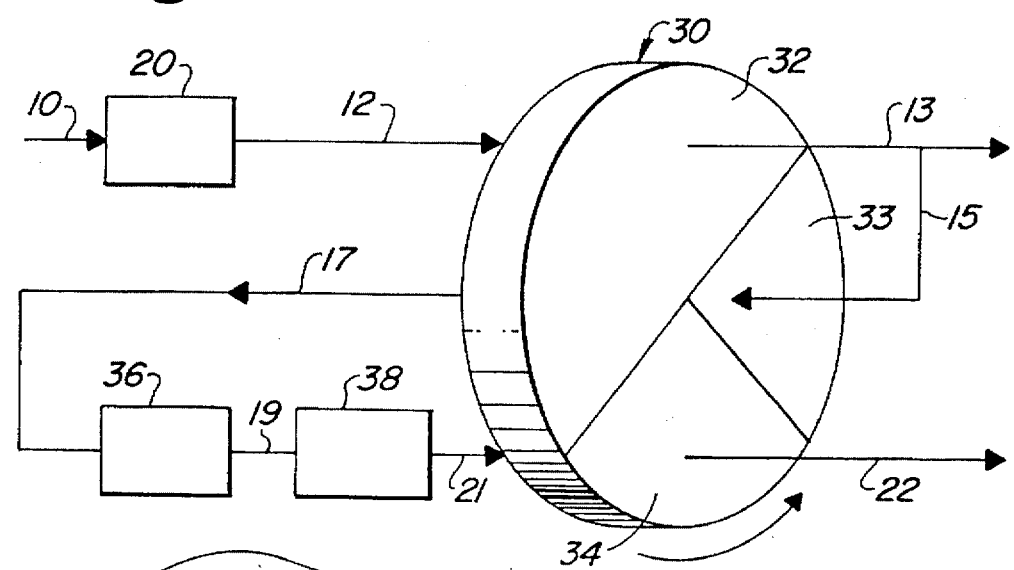
FIG. 1 is a schematic flow diagram of the process of the invention.

The air stream of the present invention is an air stream which may be withdrawn from the passenger compartment of any transportation vehicle such as automobiles, trucks, buses, rail passenger cars, and on-board ships and airplanes. Typically the air stream will contain water and VOCs. The VOCs may include fuel vapors, exhaust vapors, solvents, organic compounds, organic chlorides, and the like. Generally the air stream will contain about 0.01 ppm-v to about 10 ppm-v, have a relative humidity ranging from 35% to 100% relative humidity, and be at a temperature ranging from about −18° C. to about 40° C.

The rotating adsorbent wheel may be any gas permeable matrix formed of a plurality of spaced layers of sheet material as disclosed in U.S. Pat. No. 4,769,053 and hereby incorporated by reference. Preferably the rotating adsorbent wheel has a substrate surface which is a metal foil or sheet material such as aluminum, stainless steel, ceramic, plastic, glass or mixtures thereof formed or rolled into a wheel. Preferably the substrate surface is corrugated at such a pitch and amplitude as to provide a minimum pressure drop across the wheel and the maximum surface area for the adsorbent to be attached thereto. The adsorbent may be applied to the substrate surface of the wheel as a coating either before the layers are formed into the wheel or after the layers have been formed into the wheel. It is preferred that the layers be coated with a thin layer of adsorbent prior to the forming of the wheel. The adsorbent may be slip-coated, fused or bonded to the substrate surface by any suitable means which retains the adsorptive properties and selectivity of the adsorbent. Preferably the rotating adsorbent wheels of the present invention will range in size from about 200 mm (8 inches) to about 600 mm (2 feet) in diameter and from 25 mm (1 inch) to about 254 mm (10 inches).

Adsorbent wheel systems typically incorporate solid adsorbents such as activated carbon, activated clays, silica gel, activated alumina and crystalline molecular sieves such as zeolite molecular sieves. Zeolitic molecular sieves in the calcined form may be represented by the general formula:

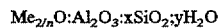

$Me_{2/n}O:Al_2O_3:xSiO_2:yH_2O$ where Me is a cation, n is the valence of the cation, x has a value from about 2 to infinity and y has a value of from about 2 to 10.

Typical well known zeolites include chabazite (also referred to as Zeolite D), clinoptilolite, erionite, faujasite (also referred to as Zeolite X and Zeolite Y), ferrierite, mordenite, Zeolite A, and Zeolite P. Detailed descriptions of the above-identified zeolites, as well as others, may be found in D. W. Breck, *Zeolite Molecular Sieves*, John Wiley and Sons, New York, 1974, hereby incorporated by reference.

Zeolites which are preferred for use in the present invention are those zeolites which permit the desorption of water at moderate to low temperatures and have a relatively low heat capacity. Such preferred zeolites may be selected from the group consisting of X and Y zeolites, and more particularly are selected from the group consisting of zeolite Y-74, zeolite Y-84, zeolite Y-85, low cerium rare earth exchanged zeolite Y-84, and rare earth exchanged LZ-210 (RE-LZ-210). Zeolite Y-74 is an ammonium exchanged, steam calcined sodium Y-zeolite, the ammonium exchange and steam calcination steps being generally disclosed in U.S. Pat. No. 5,208,197. Zeolite Y-85 is a steam stabilized modified zeolite Y the preparation of which is disclosed in U.S. Pat. No. 5,208,197 and is herein incorporated by reference. The low cerium rare earth exchanged zeolite Y-84 is prepared in a manner similar to the preparation of Y-85, except that the second ammonium ion exchange is carried out in the conventional manner at a pH well above 4.0 and the resulting zeolite is subjected to a rare earth exchange by contacting the zeolite with an aqueous solution of rare earth salt in the known manner. A mixed rare earth chloride salt can be added to an aqueous slurry of the ammonium exchanged zeolite to yield a zeolite product having a rare earth content generally in the range of 3.5 to 12.0 weight percent rare earth as $RE_2O_3$. The product is then water washed and calcined in dry air at a temperature of from about 55° C. to about 850° C., preferably 600° C. to about 750° C. for a period of time to reduce the unit cell dimension to less than 24.6 Angstroms and more particularly in the range of 24.4 to 24.6 Angstroms. The final low cerium rare earth exchanged zeolite Y-84 has a cerium content less than about 0.2 weight percent. Zeolite LZ-210 is defined in a U.S. Pat. No. 4,503,023 in column 12, lines 5–68. The rare earth exchanged zeolite LZ-210 may be prepared by subjecting the LZ-210 to a conventional rare earth exchange step followed by the dry air calcination step described above. U.S. Pat. No. 4,503,023 is hereby incorporated by reference.

For purposes of the present invention it is required that the solid adsorbent be agglomerated with a binder in order to ensure that the coating will have suitable physical properties. Although there are a variety of synthetic and naturally occurring binder materials available such as metal oxides, clays, silicas, aluminas, silica-aluminas, silica-zirconias, silica-thorias, silica-berylias, silica-titanias, silica-alumina-thorias, silica-alumina-zirconias, mixtures of these and the like, clay type binders are preferred. Examples of clays which may be employed to agglomerate the zeolites without substantially altering the adsorptive properties of the zeolite are attapulgite, kaolin, volclay, sepiolite, halloysite, palygorskite, kaolinite, bentonite, montmorillonite, illite and chlorite.

It was discovered that adsorbents of the present invention are particularly useful for dehumidification applications, especially at low relative humidity compared to a typical molecular sieve adsorbent such as zeolite 13X or a sodium Y zeolite such as zeolite Y-54. The adsorbents of the present invention showed a surprising 2 to 3 fold capacity advantage for the adsorption of water at low relative humidity such as at water partial pressures between 0.5 and 1.5 kPa. Furthermore, the adsorbents of the present invention were found to have a low heat of adsorption compared to zeolite 13X and a desirable low ratio of heat of adsorption to heat of vaporization.

In comparing the observed water adsorption isotherm for the adsorbents of the present invention to Collier's Type 1M adsorption isotherm, it was discovered that the Y-74, Y-85, low cerium rare earth exchanged zeolite Y-84, zeolite Y-84, low cerium rare earth exchanged Y-64, and RE-LZ-210 adsorbents had the negative curvature over low relative humidity ranges which Collier theorized would provide high sorption cooling efficiencies. Zeolites A, X, Y and faujasite have frameworks consisting of linked truncated octahedra ($\beta$-cages) characteristic of the structure of sodalite. The framework structures of the zeolites are composed of assemblages of tetrahedra in building units which range from simple 4-rings to large polyhedra. Zeolites X and Y and faujasite have topologically similar aluminosilicate frameworks structures, although they are distinct zeolite species with characteristic differences. The unit cells are cubic with a large cell dimension of nearly 25 Angstroms and contain 192 $(Si,Al)O_4$ tetrahedra. The aluminosilicate framework consists of a diamond-like array of linked octahedra which are joined tetrahedrally through 6-rings. The linkage between adjoining truncated octahedra is a double six-ring or hexagonal prism, containing 12 $(Si,Al)O_4$ tetrahedra. The overall structure is a regular arrangement of large 12-ring super cages and small $\beta$-cages joined by the hexagonal prisms. This structure is further described in Breck, supra, pages 92–107, and is hereby incorporated by reference. It is believed that the Type 1M adsorption properties for water and VOCs will result from X, Y, and faujasite structures with tri-valent cations, such as Lanthanides, when the tri-valent cations are located within the $\beta$-cages. The tri-valent cations are generally introduced to the zeolite structure by conventional rare earth exchange. Thus, a preferred group of adsorbents which exhibit Type 1M adsorption isotherms are of the faujasite type having isolated cations wherein at least 1 and, preferably 2, hexagonal prisms separate the tri-valent cation for the adsorbing molecules. Preferably, such zeolites are selected from the group consisting of low cerium rare earth exchanged forms of Y-zeolites. More preferably, such zeolites are selected from the group consisting of low cerium rare earth exchanged forms of zeolite Y-64, Y-84, and LZ-210. The tri-valent cations include cations from Group VIII of the Periodic Table of Elements and the Lanthanide Series. The negative curvature of the isotherm is believed to provide a well-defined and finite mass transfer zone which is not achieved with widely used adsorbents such as silica gel. Silica gel dehumidifiers generally have a greater depth in the flow direction and consequently suffer higher pressure drops and require greater amounts of energy to move air through them. Thus, the adsorbents of the present invention should provide a solution to dehumidification systems in providing higher capacity at low relative humidity and lower energy consumption than conventional systems.

FIG. 1 illustrates the process of the present invention for the dehumidification and VOC odor remediation of a cabin air stream 10 withdrawn from a passenger compartment. The cabin air stream to be dehumidified and deodorized of VOC odors is withdrawn from passenger compartment in line 10 and passed in line 10 through blower 20 and line 12 to an adsorption portion 32 of rotating adsorbent wheel 30. The rotating adsorbent wheel contains an adsorbent selective for the adsorption of water and VOCs. Preferably the rotating adsorbent wheel will have a coating of adsorbent ranging from about 0.05 mm to about 0.2 mm in thickness. Conditioned air is withdrawn from the adsorption portion via line 13. At least a portion of the conditioned air in line 13 is passed countercurrently to the direction of the cabin air stream via line 15 to a cooling portion 33 of the rotating adsorbent wheel to cool the adsorbent in the cooling zone to the adsorption temperature. Although not shown on the drawing, at least a portion of the cabin air stream carried by line 10 may be admixed with the at least a portion of the conditioned air in line 15 prior to the passing of the conditioned air in line 15 to the cooling portion 33. Typically, the adsorption temperature ranges from about $-18°$ C. to about $30°$ C. An intermediate air stream is withdrawn from the cooling portion 33 in line 17 and subsequently passed to a blower 36 and a heater 38, via line 19, to raise the temperature of a heated air stream in line 21 to a regeneration temperature above about $60°$ C. and, preferably to a regeneration temperature ranging between about $60°$ C. and about $200°$ C., and most preferably to a regeneration temperature ranging between about $60°$ C. and $80°$ C. The heated air stream in line 21 is passed to the regeneration portion 34 in a direction cocurrent to the passing of the cabin air stream in the adsorption portion. An exhaust stream is withdrawn from the regeneration portion via line 22 and released to the atmosphere. Although not shown in FIG. 1, the conditioned air stream (line 13) can be processed in an air conditioning unit to cool the stream before returning the conditioned stream to the passenger compartment. Fresh makeup air may be added at any point in the process, or admixed with the conditioned air stream prior to the air conditioning or refrigeration unit. By maintaining the relative humidity of the conditioned air in the range of 40 to 60%, the efficiency of the air conditioning or refrigeration is maintained at a higher level than if the conditioned air were not dehumidified or dehumidified beyond this range. Furthermore, the countercurrent cooling and subsequent cocurrent heating of the adsorbent contained in the rotating adsorbent wheel maximizes the driving forces for dehumidification, VOC odor remediation, and desorption.

The advantage of dehumidifying the air stream withdrawn from a passenger compartment prior to a refrigeration or air conditioning step is evidenced by the following illustration which is based on engineering calculations. Ambient air at $32°$ C. ($90°$ F.) and 95% relative humidity is to be cooled to a temperature of about $7°$ C. ($45°$ F.) at a rate of 338 m$^3$/h (200 cubic feet per minute). This cooling requires about 3 tons of air conditioning capacity. If the air is dehumidified to a relative humidity of about 40% relative humidity, only 1.7 tons of cooling capacity are required, a reduction in the cooling load of almost 43%. If a typical 3A zeolite or silica gel is employed to dehumidify the air stream, an additional heat load to regenerate the adsorbent at a temperature of up to 200° C. will be placed on the dehumidifier section. The resultant thermal dumping, or increased sensible heat load of this regeneration step, particularly when a stream of heated outside air is used to perform the regeneration, must be removed by the introduction of another stream to cool the adsorbent. In the present invention a portion of the conditioned air is employed to cool the adsorbent following regeneration. This same amount of air is heated, employed as the regeneration gas, and subsequently vented or exhausted from the process to the atmosphere. No additional heated air is added to the process, thus providing a more thermally balanced and efficient process. Because regeneration of the adsorbents of this invention can be accomplished at temperatures below 100° C. and preferably at temperatures below 80° C., a significant portion of the dehumidification savings may be retained without large sensible heat losses.

It is believed that the rates of adsorption and description are related to the product of the density of the adsorbent and the rate of change in adsorbent loading. Thus the rates of adsorption and desorption are directly proportional to the product of a mass transfer coefficient for the process and the difference between the incoming concentration and the concentration in equilibrium with the adsorbent. In the present invention a portion of the conditioned air is used to cool the previously regenerated section by contacting the coldest stream with the hottest end of the refrigerant tubes within the cooling zone, allowing the adsorption step to follow at the lowest temperature. In addition, when the difference between the adsorption temperature and the desorption temperature is relatively small, there is less sensible heat to be removed. Thus, in this flow configuration of countercurrent cooling and cocurrent regeneration, the driving forces for cooling and regeneration on the adsorbent are maximized.

Figure 1A:
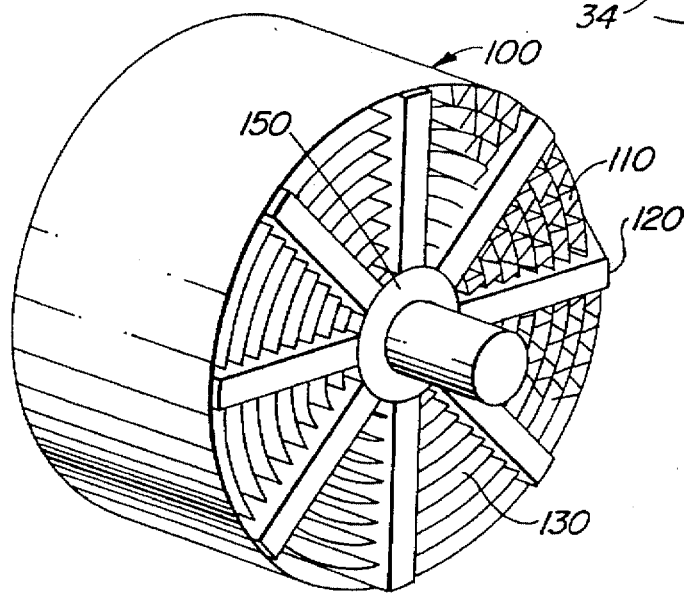
FIG. 1A is a diagram illustrating the structure of the adsorbent wheel.

FIG. 1A illustrates the typical structure of the rotating adsorbent wheel 100 having axially parallel apertures 110 of this invention. A metal sheet in the form of a long strip is corrugated by cold rolling or other processing operation. The corrugated strip may be combined with a flat metal strip or strips and rolled about a central hub 150 or shaft to form the wheel structure. The metal may be coated, preferably on both sides with the adsorbent, either prior to or following the forming of the wheel structure. The wheel structure may have a plurality of dividers 120 distributed radially about the central hub 150 to divide the wheel into a plurality of separated zones 130. The adsorbent may be applied to the substrate surface of the wheel structure by any fashion, such as spraying, direct application, slip coating, or bonding of the adsorbent. The wheel may also be constructed of plastic, glass, or ceramic by forming, extruding or molding the wheel structure, followed by the step of bonding or coating the adsorbent to fie wheel structure. Other similar wheel structures may be formed from a variety of materials and structures to provide axially parallel apertures useful in this invention.

Figure 2:
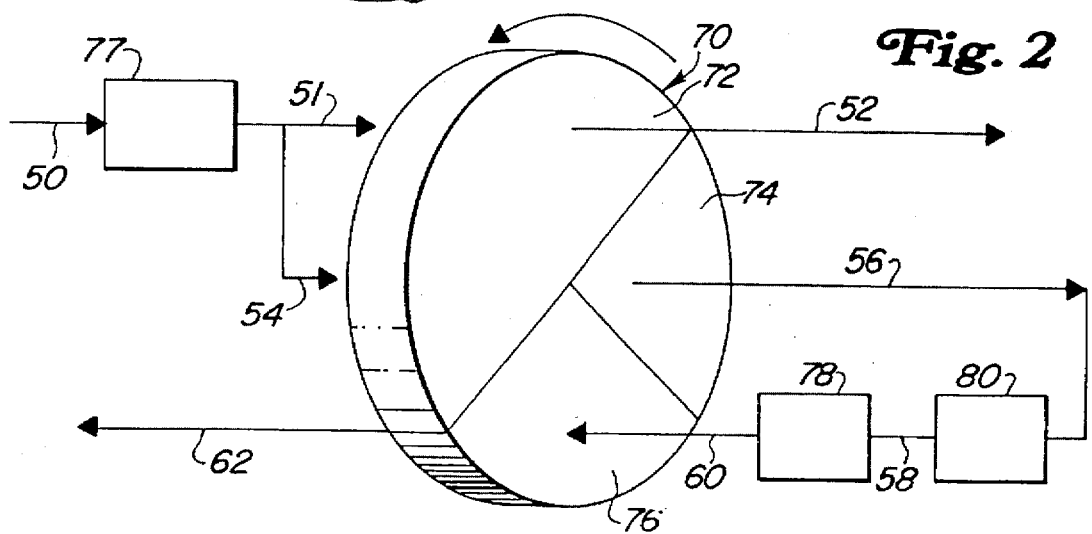
FIG. 2 is a schematic flow diagram of an alternate process of the invention.

FIG. 2 illustrates an alternative embodiment of the present invention for the dehumidification and VOC odor remediation of a cabin air stream 50 withdrawn from a passenger compartment. The cabin air stream 50, to be dehumidified and deodorized of VOC odors, is withdrawn from the passenger compartment in line 50 and passed through blower 77 to provide the airstream at a higher pressure in line 51 which is passed to rotating adsorbent wheel 70. At least a portion of the cabin air stream is passed cocurrently with the flow of the cabin air stream across the rotating adsorbent wheel to a cooling portion 74 of the rotating adsorbent wheel via line 54 and the reminder of the cabin air stream in line 51 is passed to an adsorption portion 72. A conditioned air stream is withdrawn from the adsorption portion via line 52 and returned to the passenger compartment essentially free of VOC odors and at a relative humidity ranging from about 40% to about 60%. The portion of the cabin air stream in line 54 cools the cooling zone of the rotating adsorbent wheel and is passed as an intermediate air stream in line 56 to blower 80 and by line 58 to heater 78. Heater 78 raises the temperature of the intermediate air stream to a regeneration temperature and a heated air stream is passed via line 60 to a regeneration portion 76 of the rotating adsorbent wheel in a direction countercurrent to the passage of the cabin air stream through the rotating adsorbent wheel to provide an exhaust gas stream which is withdrawn in line 62.

By the use of the at least a portion of the air stream in line 54 in FIG. 2, or by the use of the at least a portion of the conditioned air stream 15 according to FIG. 1, to cool the cooling zone of the rotating adsorbent wheel, the sensible heat added to the rotating adsorbent wheel in the regeneration zone by the equivalent amount of the air stream is removed with air withdrawn from the passenger compartment. The subsequent reheating and exhausting of this portion of the exhaust air stream in line 62 and in line 22 minimizes the sensible heat buildup, or thermal dumping common to most adsorbent wheel systems.

The following examples are provided for illustrative purposes and are not intended to limit the scope of the claims that follow.

EXAMPLES

Example I

Figure 3A:
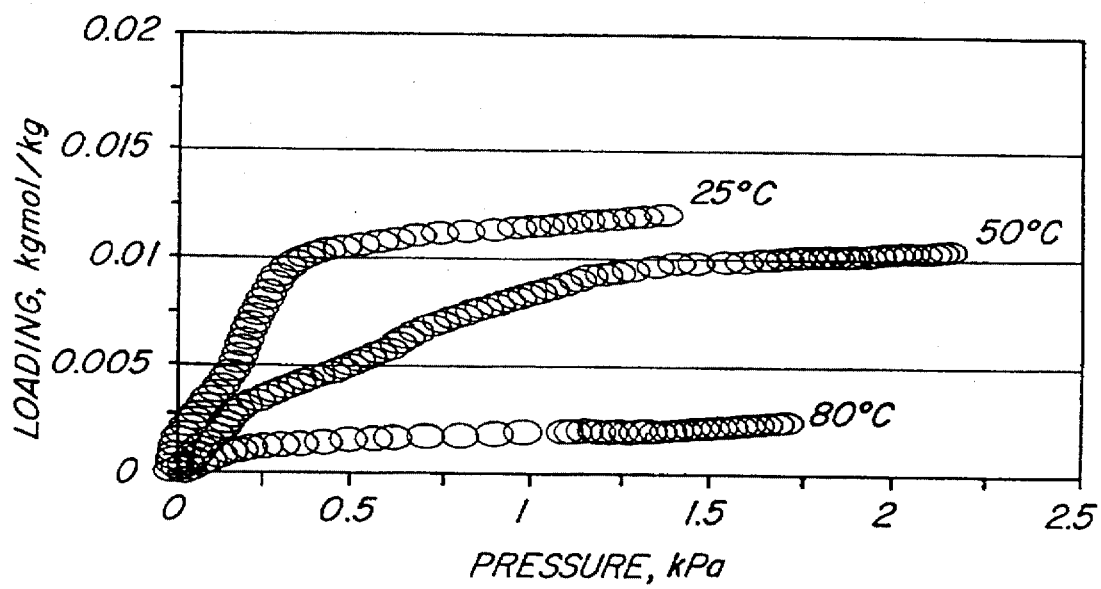
FIG. 3A is a graph showing the water isotherms for the low cerium rare earth exchanged zeolite Y-84 adsorbent.
Figure 3B:
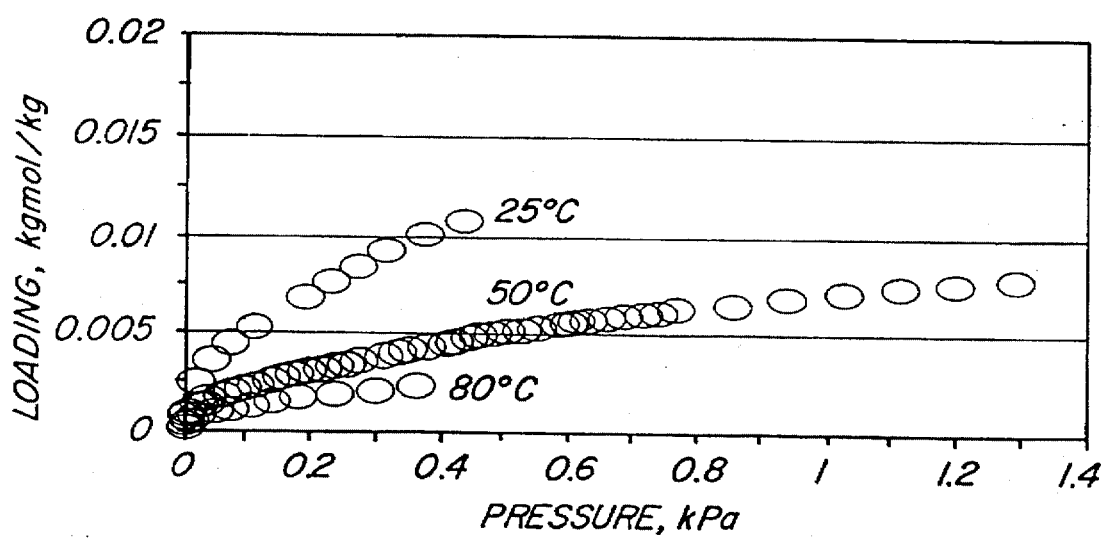
FIGS. 3B and 3C are graphs showing water isotherms for zeolite Y-85 and rare earth exchanged zeolite LZ-210.
Figure 3C:
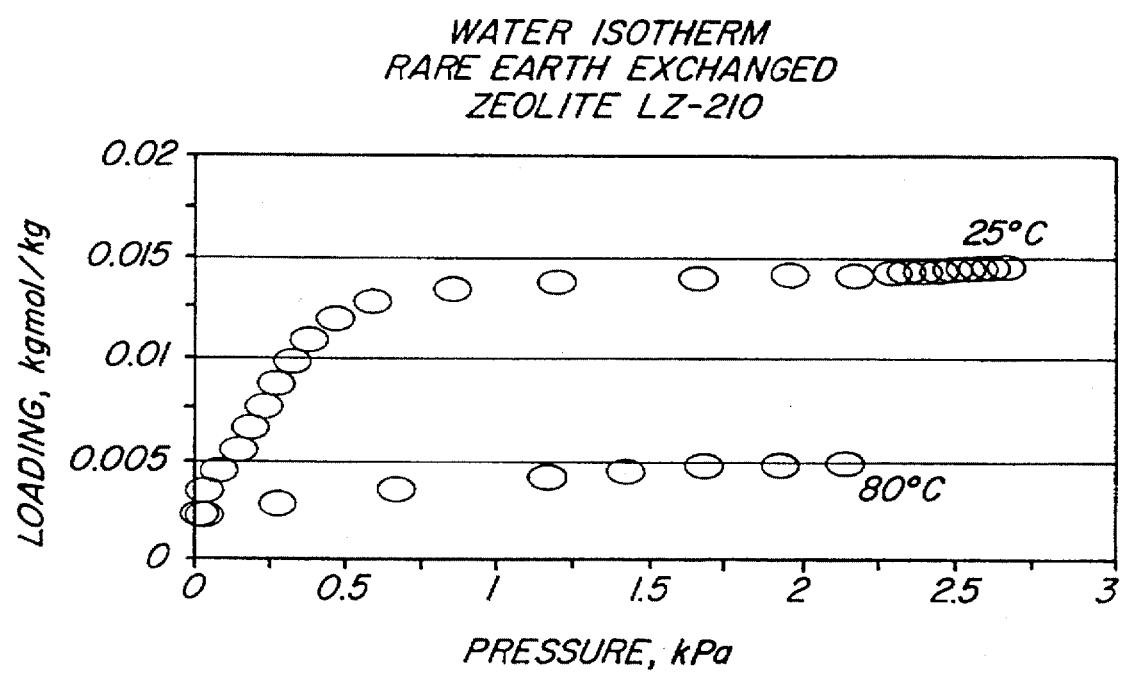
Figure 3D:
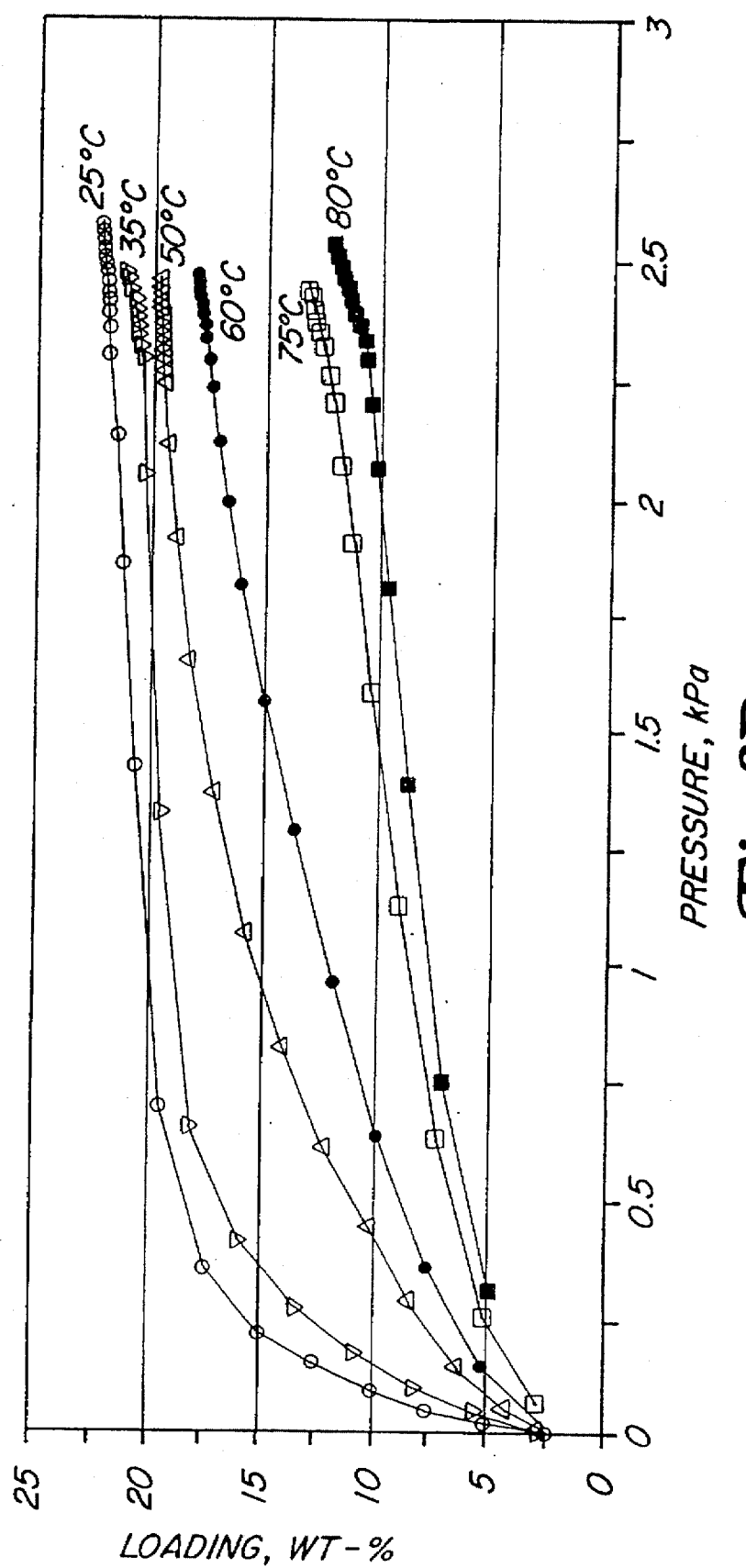
FIG. 3D is a graph showing water isotherms for zeolite Y-74.

The water adsorption screening tests were conducted in a modified BET adsorption apparatus. The apparatus measures adsorption by sensing changes in pressure and temperature inside a reference volume which is attached to an adsorption vessel containing the adsorbent sample. The adsorbent sample was maintained at a steady temperature by the action of a temperature controlled bath. The reference volume can be isolated from the adsorbent vessel by means of an isolation valve. The reference volume may also be connected or isolated from a vapor source by means of another isolation valve, and finally the absolute pressure of the reference volume may be controlled by means of a high vacuum pump which is also connected to the reference volume by means of a third isolation valve. Adsorption measurements were made by first evacuating the reference volume and the adsorbent sample vessel to a pressure of approximately $5 \times 10^{-6}$ torr while heating the adsorbent and adsorbent vessel to an activation temperature of approximately 200° C. The temperature of activation was controlled and monitored. The activation was considered complete after the pressure of the system was dropped to $5 \times 10^{-6}$ torr. (generally, about 16 hours). After activation, the sample was isolated from the reference volume and the evacuation pump and was cooled to room temperature. The reference volume also evacuated to $5 \times 10^{-6}$ torr was also isolated from the vacuum pump and was charged to a vapor pressure of about 5 torr with pure water vapor. The pressure of water was monitored by an MKS Baratron Pressure Transducer. Once stable readings were obtained on both the pressure and temperature within the reference volume, the isolation valve separating the adsorbent sample from the reference volume was opened and the pressure and temperature of the system were monitored until they stabilized, i.e., changing no more than by 1 part in $10^6$ within one minute. Water isotherms were obtained by repeating the isolation, charging and equilibration of the reference volume with the adsorbent vessel until a predetermined loading level or pressure level were obtained. Water loadings on the adsorbent samples were reported in FIG. 3A in terms of kg-mol per kg. The isotherms of water for the adsorbent were determined at 25° C., 50° C., and 80° C. The differential loading between 25° C. and 80° C. at a pressure of 0.5 kPa of about 0.009 kg mol/kg indicates a tendency for water adsorption at 25° C. and desorption at about 80° C. A water isotherm for the low cerium rare earth exchanged zeolite Y-84 is shown in FIG. 3A. Water loadings were developed to show the volumetric adsorption of the adsorbent. FIGS. 3B and 3C present similarly developed water isotherms for the adsorbents Y-85 and rare earth exchanged zeolite LZ-210, respectively, which were discovered to have equivalent differential loadings at about 0.5 kPa. FIG. 3D illustrates adsorption isotherms for zeolite Y-74, which indicate a loading of about 11 wt-% at 0.5 kPa between about 25° C. and about 80° C., indicating good adsorption at low water partial pressure.

Example II

A compartment having a volume of approximately 2.8 cubic meters (100 cubic feet) was constructed to simulate the passenger compartment of a passenger vehicle. As shown in FIG. 1, a blower with a capacity of about 425 m³/h (250 cubic feet/min) was employed to withdraw a cabin air stream from the compartment and pass the cabin air stream across about ½ the cross-section of a 305 mm (12 inch) diameter by 150 mm (6 inch) rotating adsorbent wheel to provide a conditioned air stream. The adsorbent wheel was coated with a low cerium rare earth exchanged zeolite Y-84, prepared as described hereinabove and applied to both sides of an extruded cordierite substrate surface having about 400 square cells per square inch of face area. The physical properties of the adsorbent wheel were as follows:

Total apparent density 556 kg/m³
Adsorbent density 155 kg/m³
Specific surface area 2680 m²/m³
Open face area fraction 0.68

A flow splitting plenum was employed to withdraw about a 25% portion of the conditioned air stream through a second blower, and the 25% portion of the conditioned stream was passed back through the adsorbent wheel, in a direction countercurrent to the cabin air stream passing, to isosterically cool without further adsorption or desorption a second potion of the wheel, the second portion comprising about 25% of the adsorbent wheel and providing an intermediate stream. The intermediate stream was heated to a temperature of about 80° C. and passed cocurrently through a third portion of the adsorbent wheel (the remaining 25% of the adsorbent wheel) in a regeneration step to desorb and exhaust the adsorbed water and VOCs in an exhaust stream. The remaining portion of the conditioned stream and any fresh air makeup was returned to the compartment.

Example III

Figure 4:
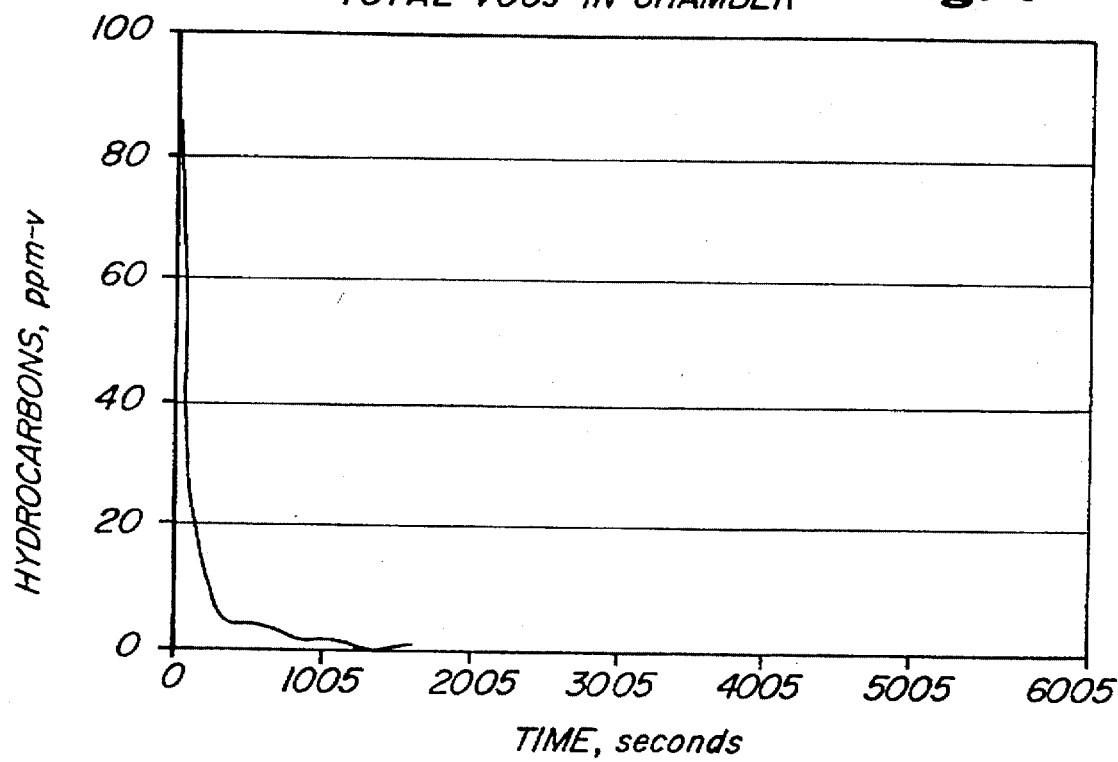
FIG. 4 is a graph showing the experimental results of removing VOCs from a simulated passenger compartment.

The compartment of Example II was initially loaded with about 90 ppm-V organic material comprising toluene. Samples of the air in the compartment were measured at the center of the compartment by a composition probe. The operation of the adsorbent wheel was begun and the concentration of the hydrocarbons monitored at regular intervals. The results of this Example III are shown in FIG. 4. Within the first 5 minutes on stream, the concentration of the hydrocarbons dropped rapidly from the initial value of 90 ppm-v to less than 20 ppm-v. After 16 minutes there were no detectable hydrocarbons remaining in the compartment.

Example IV

Figure 5:
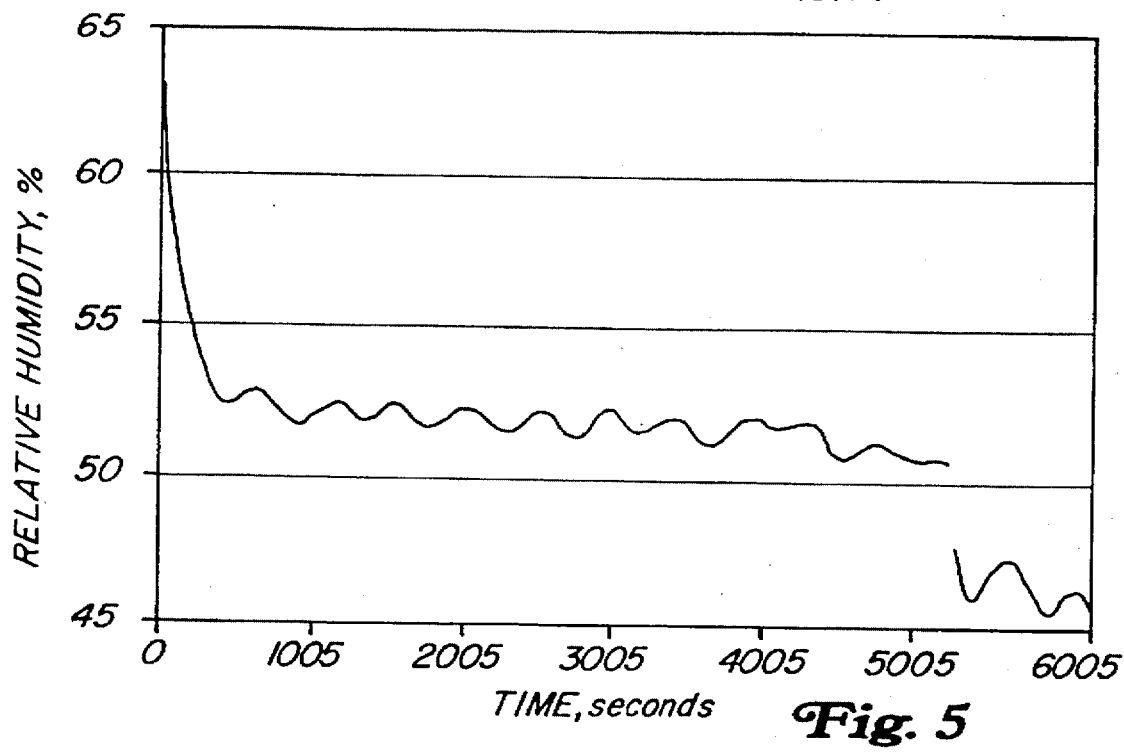
FIG. 5 is a graph showing the reduction of humidity in a simulated passenger compartment.

The compartment of Example II was initially loaded with water to provide a relative humidity of about 64% as measured in the center of the compartment. The results of this experiment are shown in FIG. 5. Air withdrawn from the process was replaced with ambient air having about a 55% relative humidity. As in Example III, after the first 5 minutes of the experiment, the relative humidity dropped to a relative humidity of between 50% and 52% and was maintained at that level throughout the experiment. Near the end of the experiment, the humidity probe was shifted to measure the relative humidity of the conditioned air returned to the compartment. The relative humidity of the conditioned air was about 45% to about 46%. The temperature of the air stream passed to the adsorbent wheel ranged from about 19° to 21° C., the temperatures of the conditioned air returned to the chamber ranged from about 24° C. to about 26° C. and the temperature of the exhaust gas expelled from the system ranged from between about 30° C. to about 32° C.

Example V

Figure 6:
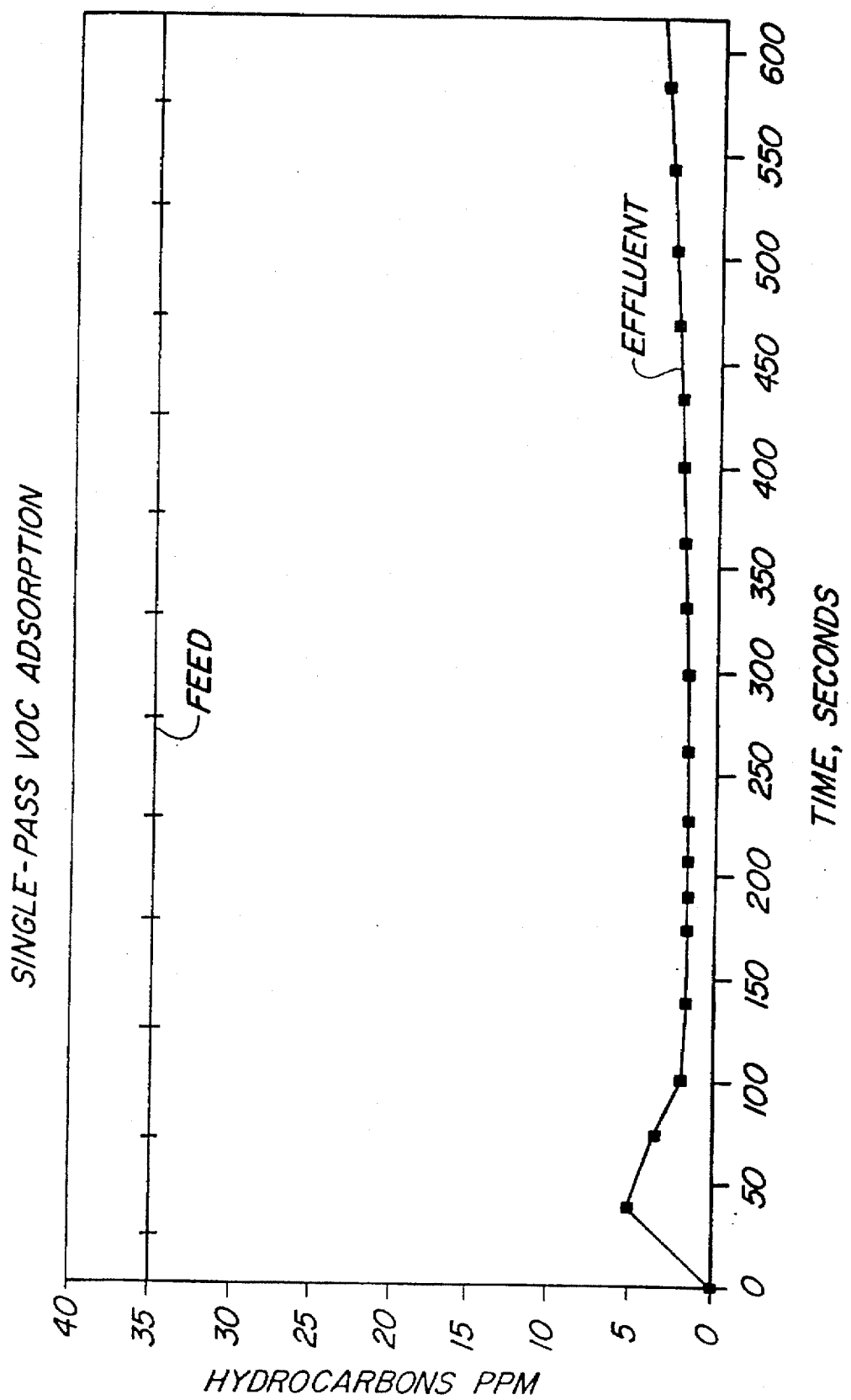
FIG. 6 is a graph of a single-pass segment of the adsorbent wheel on an air stream containing hydrocarbons.
Figure 7:
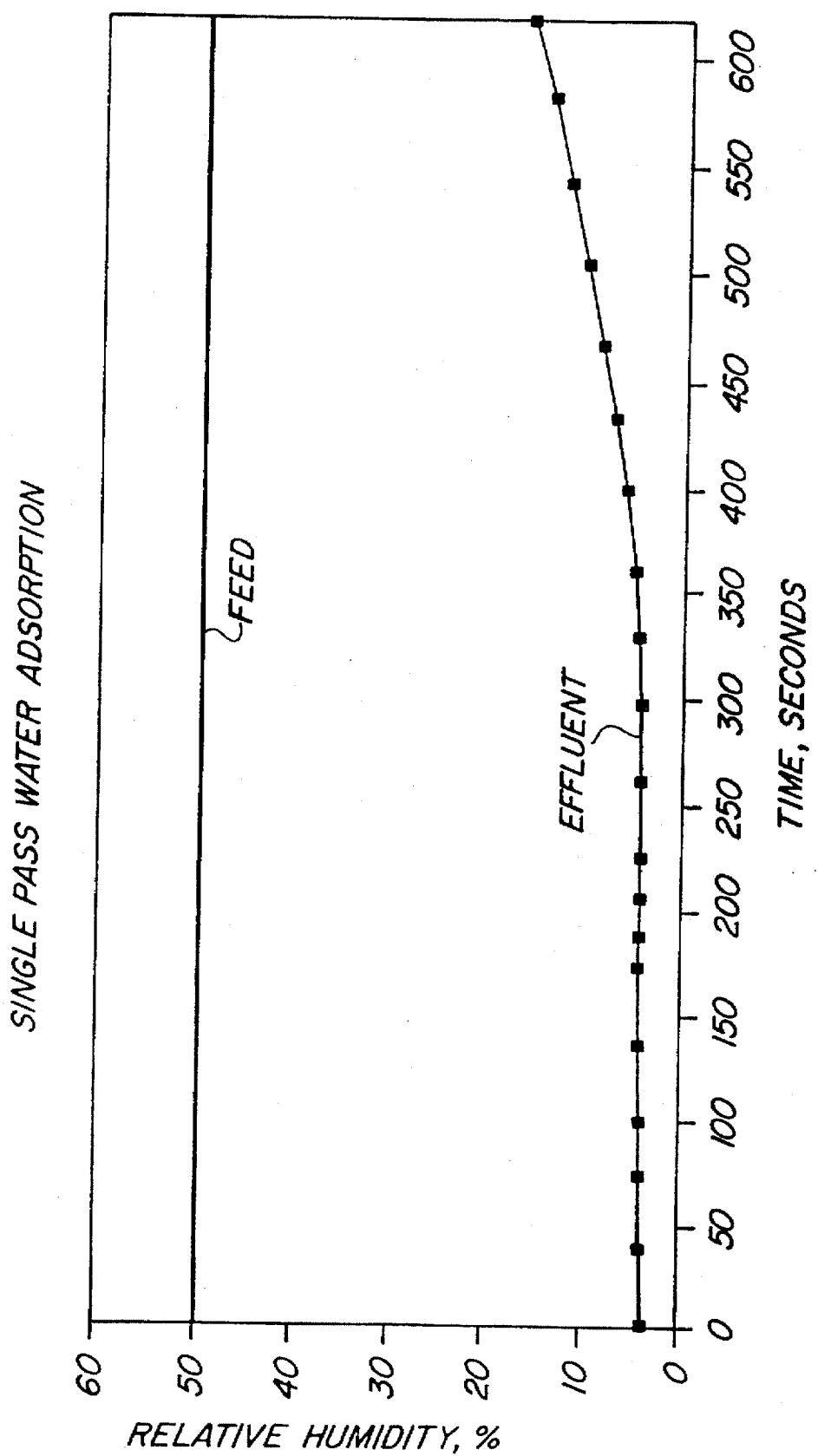
FIG. 7 is a graph of a single-pass segment of the adsorbent wheel on an air stream containing water.

A 25 mm (1 inch) diameter×150 mm (6 inch) core portion of the adsorbent wheel in Example II was removed and placed in a chamber having a feed end and an effluent end. A feed air stream at a 50% relative humidity and containing about 35 ppm-V hydrocarbons comprising about 30 ppm-v toluene and about 5 ppm-v propylene was passed through the core portion in the chamber for a period of 600 seconds. FIG. 6 illustrates the adsorption effects on hydrocarbons and FIG. 7 illustrates the adsorption effect on humidity in this single-pass mode. Over the period of the 600 second test, the hydrocarbons in the effluent remained below 4 ppm-v, and the humidity of this effluent air remained below 15%. This showed that the adsorbent functioned effectively for both dehumidification and VOC odor remediation.

Example VI

The core portion of the adsorbent wheel of Example V was activated by the introduction of an air stream having a 50% relative humidity at a regeneration temperature of about 80° C. Following regeneration times of 300 seconds and 600 seconds, over 90% of the VOCs were removed from the core portion.

Example VII

Table 1 shows a comparison of adsorbent delta loadings for water on various desiccants at a vapor pressure of about 1.5 kPa between an adsorption temperature of about 25° C. and a desorption temperature of about 80° C.

TABLE 1

| ADSORBENT | ADSORPTION 25° C. | DESORPTION 80° C. | DELTA LOADING, WT % |
|---|---|---|---|
| Y-54 zeolite | 23.5 | 17.5 | 6.0 |
| Y-74 zeolite | 20.8 | 8.8 | 12.0 |
| Y-84 zeolite | 21.5 | 9.0 | 12.5 |
| RE-LZ-210 | 24.6 | 6.5 | 18.1 |
| 13X zeolite | 24.6 | 17.5 | 7.1 |

The higher delta loadings for zeolite Y-74, zeolite Y-84, and RE-LZ-210 clearly show a 2 to 3 fold capacity advantage of using these adsorbents of the present invention in dehumidification applications over the conventional 13X and Y-54 zeolite molecular sieves.

Example VIII

Table 2 compares the heat of adsorption for the desiccants of Example VII. The heats of adsorption shown in Table 2 were derived from the isotherm data of Example I and Example VII.

TABLE 2

| ADSORBENT | HEAT OF ADSORPTION CAL/GM MOLE |
|---|---|
| Y-54 | 10,906 |
| Y-74 | 11,300 |
| Y-84 | 12,500 |
| RE-LZ-210 | 9,600 |
| 13X | 15,100 |

At 25° C., water has a heat of vaporization of about 9720 cal/gm mol. Thus, the rare earth exchanged LZ-210 had a heat of adsorption less than the heat of vaporization of water and the Y-74 and Y-84 zeolites had a heat of adsorption slightly greater than the heat of vaporization of water. This low ratio of heat of adsorption to heat of vaporization combined with the delta loadings shown in Table 1 show that the adsorbents of the present invention compare favorably to the Type 1M characteristics theorized by Collier.

Example IX

Figure 8:
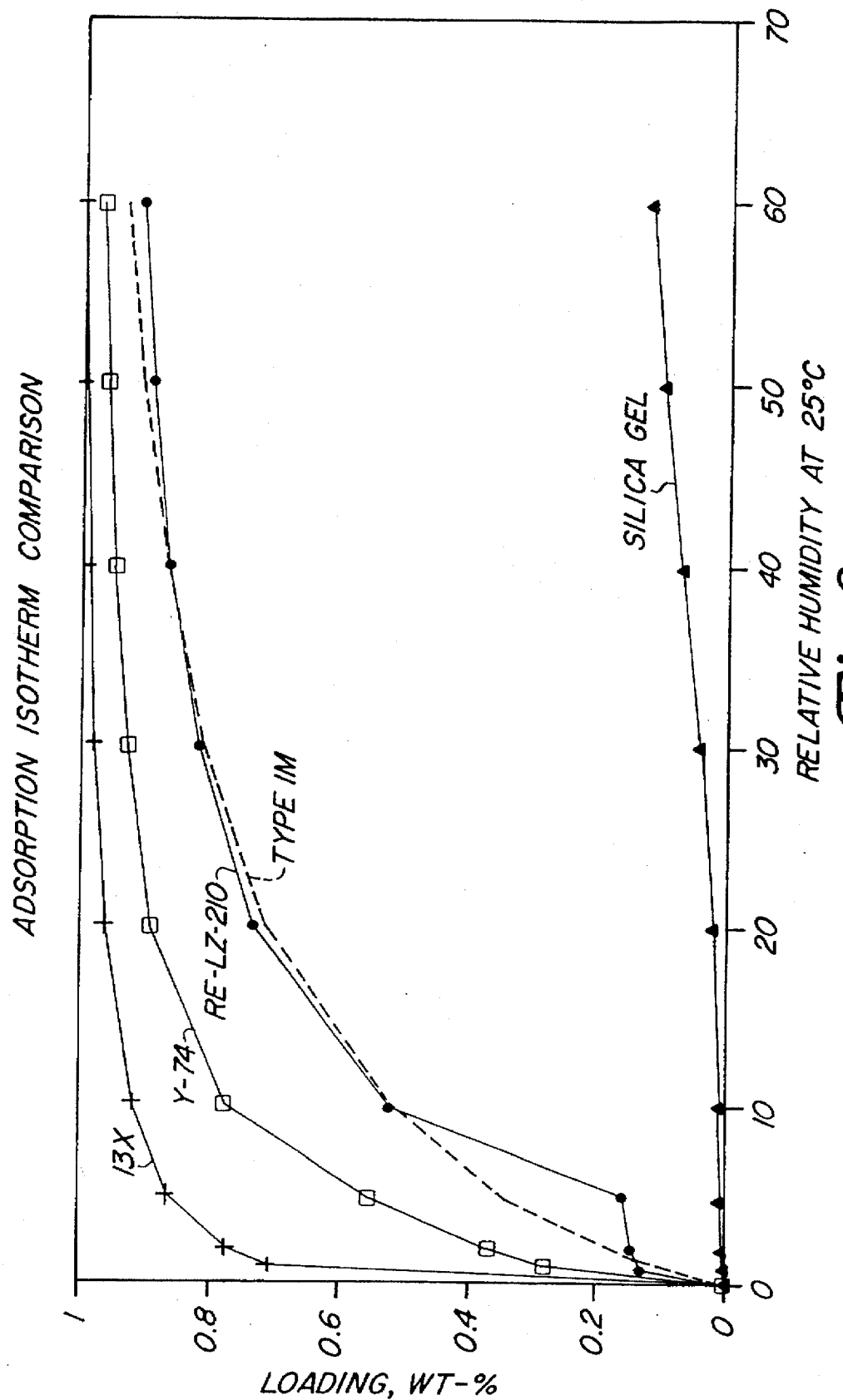
FIG. 8 is a graph comparing the Type 1M adsorption isotherm with adsorption isotherms of other adsorbents.

FIG. 8 shows a comparison of adsorption isotherms for a variety of desiccants relative to the Type 1M adsorption isotherm proposed by Collier. Molecular sieve adsorbents have an isotherm similar to that of zeolite 13X. Adsorbents having an isotherm similar to 13X include zeolite Y-54 and zeolite 3A and 4A molecular sieve. Silica gel has an almost linear isotherm with very low loadings at low relative humidity. The adsorbents of the present invention shown as rare earth exchanged LZ-210 (RE-LZ-210) and zeolite Y-74 display the negative curvature over the range theorized by Collier and follow the shape of the Type 1M adsorbent. Zeolite Y-85 and low cerium rare earth exchanged Y-84, although not plotted here, have a adsorption isotherms similar to Y-74 and RE-LZ-210 and thus providing a good driving force for the adsorption of water at low relative humidity. When one considers the 2–3 fold capacity advantage of the Y-74, Y-85, and RE-LZ-210 adsorbents, the low ratio of heat of adsorption to heat of vaporization, and the negative curvature of the adsorption isotherms similar to the Type 1M isotherm, these adsorbents are clearly superior desiccants for use in adsorbent wheel system for dehumidification and sorption cooling operations. In addition, these adsorbents have the ability to be desorbed at relatively low desorption temperatures compared to conventional molecular sieves or silica gel.

Example X

Figure 9:
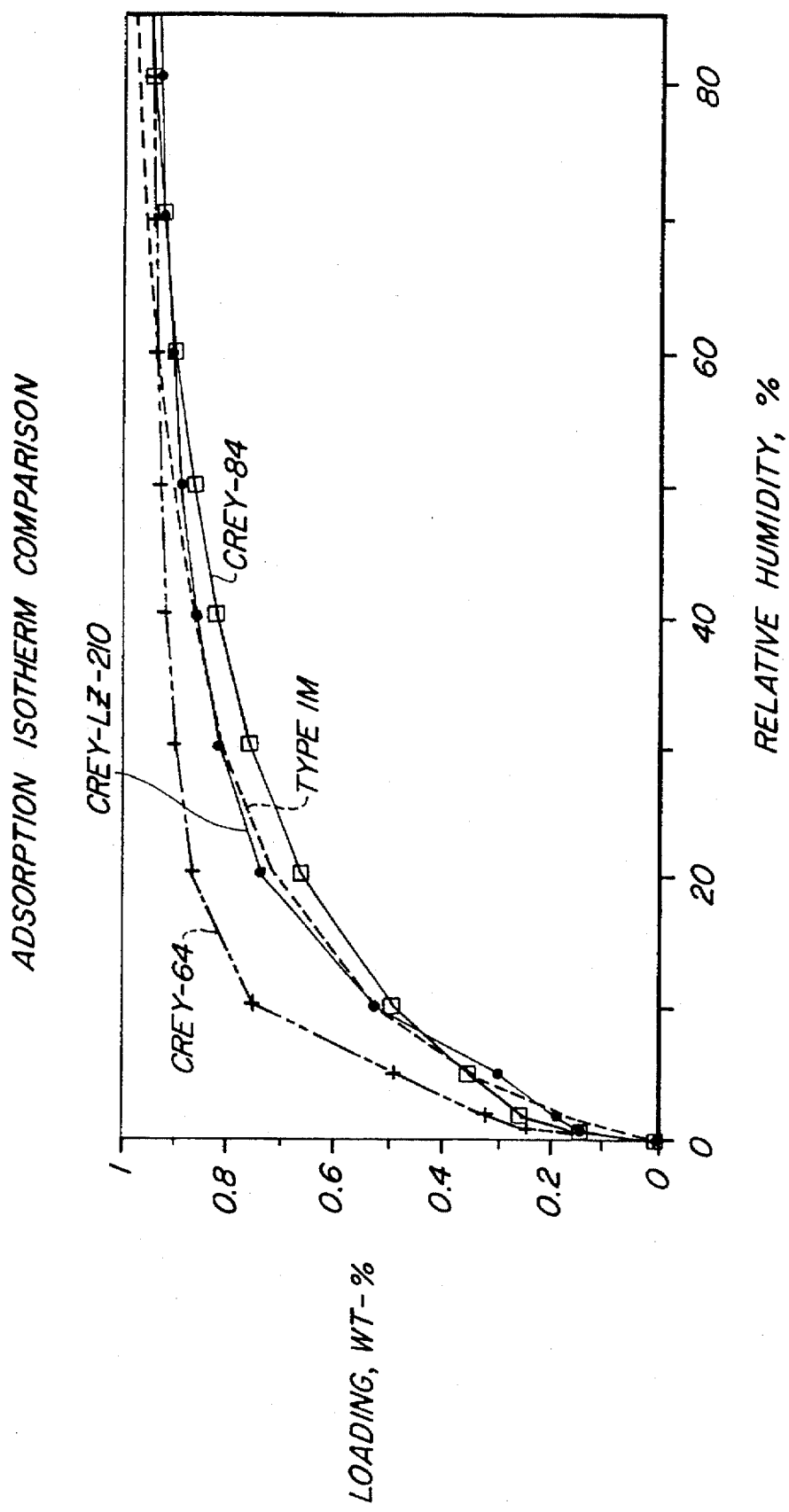
FIG. 9 is a graph comparing the Type 1M adsorption isotherm with adsorption isotherms of low cerium rare earth exchanged zeolites Y-84, Y-64, and LZ-210.

FIG. 9 shows a comparison of adsorption isotherms for low cerium rare earth exchanged Y-zeolites having tri-valent cations including low cerium rare earth exchanged forms of Y-64, Y-84, and LZ-210, to the Type 1M isotherm proposed by Collier. Zeolite Y-64 is the ammonium exchanged form of a zeolite Y composition synthesized by any of the processes well known in the art. A representative synthesis process is disclosed in U.S. Pat. No. 3,130,007. As shown in FIG. 9, the adsorption isotherm for the low cerium rare earth exchanged Y-64 also follows the shape of the Type 1M adsorbent. Surprisingly, the low cerium rare earth exchanged Y zeolite forms of Y-64, Y-84 and LZ-210 appear to exhibit the Type 1M adsorption isotherm suggesting a relationship between the crystal structure of the Y zeolite and the location of the rare earth ions, which are tri-valent cations in the Lanthanide series, including those cations resulting from low cerium rare earth exchange.

I claim:

1. A process for dehumidification and VOC odor remediation of a cabin air stream withdrawn from a passenger compartment of a transportation vehicle comprising the following steps:
    (a) continuously passing the cabin air stream to a first portion of a face area of an adsorbent wheel, said wheel supporting a solid adsorbent comprises a faujasite having a zeolite structure including $\beta$-cages with tri-valent cations located within the $\beta$-cages of said solid adsorbent being selective for the adsorption of water and VOCs to adsorb water and VOCs at an adsorption temperature and permitting the passage of said cabin air stream therethrough to provide a conditioned air stream;
    (b) passing at least a portion of said conditioned air stream to a second portion of said adsorbent wheel in a direction countercurrent to the passing of said cabin air stream in step (a) to cool said second portion of said adsorbent wheel and provide an intermediate air stream;
    (c) heating said intermediate air stream to a regeneration temperature to provide a heated intermediate air stream;
    (d) passing said heated intermediate stream in a direction cocurrent to said air stream in step (a) to a third portion of said adsorbent wheel to desorb said water and VOCs, to form an exhaust stream, and exhausting said stream; and
    (e) returning at least a portion of said conditioned air stream to the passenger compartment.

2. The process of claim 1 further comprising cooling said conditioned air stream prior to step (e).

3. The process of claim 1 wherein said faujasites are selected from the group consisting of low cerium rare earth exchanged forms of Y-zeolite.

4. The process of claim 1 wherein said faujasites comprise tri-valent compounds including cations selected from Group VIII of the Periodic Table of Elements and the Lanthanide Series.

5. The process of claim 1 further comprising admixing at least a portion of said cabin air stream with said at least a portion of said conditioned air stream prior to the passing of the at least a portion of said conditioned air stream to said second portion.

6. The process of claim 1 wherein said second portion of said adsorbent wheel is between said third portion and said first portion whereby said second portion of said adsorbent wheel is returned to the adsorption temperature following step (d).

7. The process of claim 1 wherein said adsorbent wheel supporting said solid adsorbent comprises an aluminum substrate surface.

8. The process of claim 1 wherein said second portion of said adsorbent wheel ranges from about 20% to about 60% of the face area of said first portion of said adsorbent wheel.

9. The process of claim 1 wherein said third portion of said adsorbent wheel ranges from about 20% to about 60% of the face area of said first portion of said adsorbent wheel.

10. A process for the dehumidification and VOC odor remediation of a cabin air stream withdrawn from a passenger compartment of an automobile comprising the following steps:

(a) passing the cabin air stream through a first portion of a continuously rotating adsorbent wheel, said wheel supporting a solid adsorbent selective for the adsorption of water and VOCs, said adsorbent selected from the group consisting of low cerium rare earth exchanged forms of Y zeolites to provide a conditioned air stream;

(b) passing a cooling air stream through a second portion of said wheel to a cool said second portion and to provide an intermediate air stream;

(c) heating said intermediate air stream to provide a heated air stream and passing said heated air stream to a third portion of said wheel to desorb said water and VOCs from said adsorbent and provide an exhaust stream; and (d) cooling said conditioned air stream to provide a cooled air stream and returning at least a portion of said cooled air stream to said passenger compartment.

11. The process of claim 10 wherein said cooling air stream comprises a portion of the conditioned air stream.

12. The process of claim 11 wherein said cooling air stream is passed through said wheel in a direction which is countercurrent to said cabin air stream passing.

13. The process of claim 12 wherein said heated air stream is passed through said wheel in a direction which is cocurrent to said cabin air stream passing.

14. The process of claim 10 wherein said cooling air stream comprises at least a portion of said cabin air stream.

15. The process of claim 14 wherein said heated air stream is passed through said wheel in a direction which is countercurrent to said cabin air stream passing.

16. A process for dehumidification of an air stream comprising:

(a) contacting the air stream with a solid adsorbent selected from the group consisting of low cerium rare earth exchanged Y zeolites; and (b) regenerating said solid adsorbent by contacting said solid adsorbent with a heated gas stream at a regeneration temperature.

17. The process of claim 16 wherein the regeneration temperature is less than about 100° C.

18. The process of claim 16 wherein the regeneration temperature is less than about 80° C.

19. An improved adsorbent wheel for the dehumidification and VOC odor remediation of an air stream comprising:

a substrate surface formed into a rotatable wheel having axially parallel apertures therethrough said substrate surface having a coating of a selective adsorbent for the adsorption of water and VOC molecules, said selective adsorbent selected from the group consisting of faujasites having a zeolite structure including $\beta$-cages and hexagonal prisms wherein tri-valent cations are located within said $\beta$-cages and at least one hexagonal prism separates said tri-valent cation from said VOC molecules.

20. The improved adsorbent wheel of claim 19 wherein said substrate surface is selected from the group consisting of ceramic, glass, plastic, aluminum, steel, aluminized steel, and mixtures thereof.

21. The improved adsorbent wheel of claim 19 wherein said coating has a thickness ranging from about 0.05 mm to about 0.2 mm.

22. The improved adsorbent wheel of claim 19 further comprising a plurality of pie-shaped dividers formed in said rotatable wheel and extending axially therethrough separating said axially parallel apertures into a plurality separated zones.

23. The improved adsorbent wheel of claim 19 wherein said wheel ranges from about 200 mm (8 inches) to about 610 mm (2 feet) in diameter.

* * * * *